United States Patent Office.

HENRY J. SMITH, OF BOSTON, ASSIGNOR TO JOSEPH C. WIGHTMAN, OF NEWTON, MASSACHUSETTS.

Letters Patent No. 82,445, dated September 22, 1868.

IMPROVED MODE OF HARDENING GAS-BURNER TIPS MADE FROM SOAPSTONE, &c.

*The Schedule referred to in these Letters Patent and making part of the same.*

TO ALL WHOM IT MAY CONCERN:

Be it known that I, HENRY J. SMITH, of Boston, in the county of Suffolk, and Commonwealth of Massachusetts, have invented a new and useful Improvement in the Method of Hardening Gas-Burners and Gas-Burner Tips made from Soapstone, Talc, and Talcose Rocks or Minerals, and rendering them hard and impervious to the action of acids contained in any illuminating-gas, and unaffected by heat.

For this purpose, I select the soft soapstone, free from grit, and form it into round sticks, suitable for the purpose.

Suitable lengths of these sticks are then turned or formed into the proper size and shape for gas-burners or gas-burner tips, each of which is cut from the main stick as fast as finished. After this the burner or burner-tip is drilled or sawed for the style of tip or burner required.

The burners or tips, after being perfected in their soft state, are placed in a vessel containing some form of carbon, like animal charcoal, vegetable or mineral coal, or plumbago, (I usually use animal carbon,) and are then heated, in the vessel containing the carbon, to a high red heat. From this process they are taken, hard and fit for use.

*Claim.*

What I claim as new, and desire to secure by Letters Patent, is—

The hardening, and rendering impervious to the action of acids and heat, of gas-burners and gas-burner tips, or any part thereof, made from soapstone, talc, talcose rocks, or minerals, by heating them in a vessel containing carbon, substantially as above described.

HENRY J. SMITH.

Witnesses:
   F. V. BALCH,
   GEO. W. QUIMBY.